United States Patent
Hampton et al.

(10) Patent No.: US 8,381,098 B2
(45) Date of Patent: Feb. 19, 2013

(54) WEBPAGE REQUEST HANDLING

(75) Inventors: Mark Carl Hampton, Newtown (AU); Eric Martinez de Morentin, Manly (AU); Kenneth Sabir, Marrickville (AU)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 12/748,510

(22) Filed: Mar. 29, 2010

(65) Prior Publication Data

US 2011/0238924 A1  Sep. 29, 2011

(51) Int. Cl.
*G06F 17/00* (2006.01)
(52) U.S. Cl. ......... 715/250; 715/255; 711/138; 709/242
(58) Field of Classification Search .................. 715/250, 715/249; 711/138
See application file for complete search history.

(56) References Cited

U.S. PATENT DOCUMENTS

| | | | |
|---|---|---|---|
| 6,351,767 B1 | 2/2002 | Batchelder et al. | |
| 7,594,001 B1* | 9/2009 | Ebbo et al. | 709/219 |
| 2003/0191800 A1* | 10/2003 | Challenger et al. | 709/203 |
| 2003/0191858 A1* | 10/2003 | Adusumilli | 709/246 |
| 2004/0068579 A1* | 4/2004 | Marmigere et al. | 709/242 |
| 2005/0004978 A1 | 1/2005 | Reed et al. | |
| 2005/0033926 A1* | 2/2005 | Dumont | 711/138 |
| 2005/0154837 A1* | 7/2005 | Keohane et al. | 711/138 |
| 2007/0288589 A1* | 12/2007 | Chen et al. | 709/217 |
| 2008/0040672 A1 | 2/2008 | Appleyard et al. | |

* cited by examiner

*Primary Examiner* — Adam M Queler
*Assistant Examiner* — Howard Cortes
(74) *Attorney, Agent, or Firm* — Patterson & Sheridan, LLP

(57) ABSTRACT

A method, computer program product, and system for webpage request handling is described. A method may comprise recording, in a memory, a change time for each of a plurality of elements of a website available from an origin server, each time a change to any one of the plurality of elements occurs. The method may further comprise updating a system-last-modified time of the website to a latest change time.

20 Claims, 5 Drawing Sheets

| Element | Change Time |
|---|---|
| Video | 12/18/09 17:27:33 GMT |
| News Story | 12/18/09 15:30:00 GMT |
| Audio Track | 11/01/09 08:37:26 GMT |
| Search Result | 12/18/09 18:33:37 GMT |
| System-Last-Modified Time | 12/18/09 18:33:37 GMT |

FIG. 5

WEBPAGE REQUEST HANDLING

BACKGROUND OF THE INVENTION

This disclosure relates to webpage request handling and, more particularly, to a method, computer program product, and system for handling requests for dynamically aggregated web pages.

Users may request web pages from web servers. Web servers may have to build web pages to provide them to the user's computer. Building web pages may require using processing resources at the web server. Also, providing web pages to the user's computer may require use of bandwidth. Accordingly, there may be a need to reduce resources and bandwidth used while handling webpage requests.

BRIEF SUMMARY OF THE INVENTION

In a first embodiment, a method may comprise recording, in a memory, a change time for each of a plurality of elements of a website available from an origin server, each time a change to any one of the plurality of elements occurs. The method may further comprise updating a system-last-modified time of the webpage to a latest change time.

One or more of the following features may be included. The method may also comprise, if the system-last-modified time of the website is later than a last-modified time of a copy of a webpage stored in a cache of at least one of a client electronic device, a proxy server, and the origin server, rebuilding the webpage at the origin server in response to a request for the webpage. If the system-last-modified time of the website is not later than the last-modified time of the copy of the webpage stored in the cache of at least one of a client electronic device, a proxy server, the webpage may be retrieved from the cache. A webpage may be rebuilt at the origin server if an if-modified-since HTTP request is true based upon, at least in part, at least one of the system-last-modified time and the latest change time. A webpage may be retrieved from a cache of at least one of a client electronic device, a proxy server, and the origin server, if a 304 not-modified HTTP status code is returned in response to an if-modified-since HTTP request based upon, at least in part, at least one of the system-last-modified time and the latest change time.

The method may further comprise determining if the change has no effect on content of the webpage and updating the system-last-modified time of the website without the change time of the change if it has no effect on the content of the webpage. Additionally, the method may comprise storing a copy of the webpage rebuilt at the origin server in the cache of the client electronic device, the webpage having one or more access controlled elements and setting a cache-control header of the webpage to private. A webpage may be added to a configurable exclusion list if at least one element on the webpage comes from a third party and a change time for the element cannot be determined by the origin server. External caching of the webpage may be prevented.

In a second embodiment, a computer program product may reside on a computer readable storage medium and may have a plurality of instructions stored on it. When executed by a processor, the instructions may cause the processor to perform operations comprising recording, in a memory, a change time for each of a plurality of elements of a website available from an origin server, each time a change to any one of the plurality of elements occurs. The operations may further comprise updating a system-last-modified time of the webpage to a latest change time.

One or more of the following features may be included. The operations may also comprise, if the system-last-modified time of the website is later than a last-modified time of a copy of a webpage stored in a cache of at least one of a client electronic device, a proxy server, and the origin server, rebuilding the webpage at the origin server in response to a request for the webpage. If the system-last-modified time of the website is not later than the last-modified time of the copy of the webpage stored in the cache of at least one of a client electronic device, a proxy server, the webpage may be retrieved from the cache. A webpage may be rebuilt at the origin server if an if-modified-since HTTP request is true based upon, at least in part, at least one of the system-last-modified time and the latest change time. A webpage may be retrieved from a cache of at least one of a client electronic device, a proxy server, and the origin server, if a 304 not-modified HTTP status code is returned in response to an if-modified-since HTTP request based upon, at least in part, at least one of the system-last-modified time and the latest change time.

The operations may further comprise determining if the change has no effect on content of the webpage and updating the system-last-modified time of the website without the change time of the change if it has no effect on the content of the webpage. Additionally, the operations may comprise storing a copy of the webpage rebuilt at the origin server in the cache of the client electronic device, the webpage having one or more access controlled elements and setting a cache-control header of the webpage to private. A webpage may be added to a configurable exclusion list if at least one element on the webpage comes from a third party and a change time for the element cannot be determined by the origin server. External caching of the webpage may be prevented.

In a third embodiment, a computing system is provided. The computing system may include at least one processor and at least one memory architecture coupled with the at least one processor. The computing system may also include a first software module executed on the at least one processor and the at least one memory architecture, wherein the first software module is configured to record, in a memory, a change time for each of a plurality of elements of a website available from an origin server, each time a change to any one of the plurality of elements occurs. Further, the computing system may include a second software module configured to update a system-last-modified time of the website to a latest change time.

One or more of the following features may be included. A third software module may be configured to, if the system-last-modified time of the website is later than a last-modified time of a copy of a webpage stored in a cache of at least one of a client electronic device, a proxy server, and the origin server, rebuild the webpage at the origin server in response to a request for the webpage. A fourth software module may be configured to, if the system-last-modified time of the website is not later than the last-modified time of the copy of the webpage stored in the cache of at least one of a client electronic device, a proxy server, and the origin server, retrieve the webpage from the cache. A fifth software module may be configured to rebuild a webpage at the origin server if an if-modified-since HTTP request is true based upon, at least in part, at least one of the system-last-modified time and the latest change time.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

FIG. 5 is a chart associated with the website of FIG. 4.

DETAILED DESCRIPTION OF THE INVENTION

Figure 1:
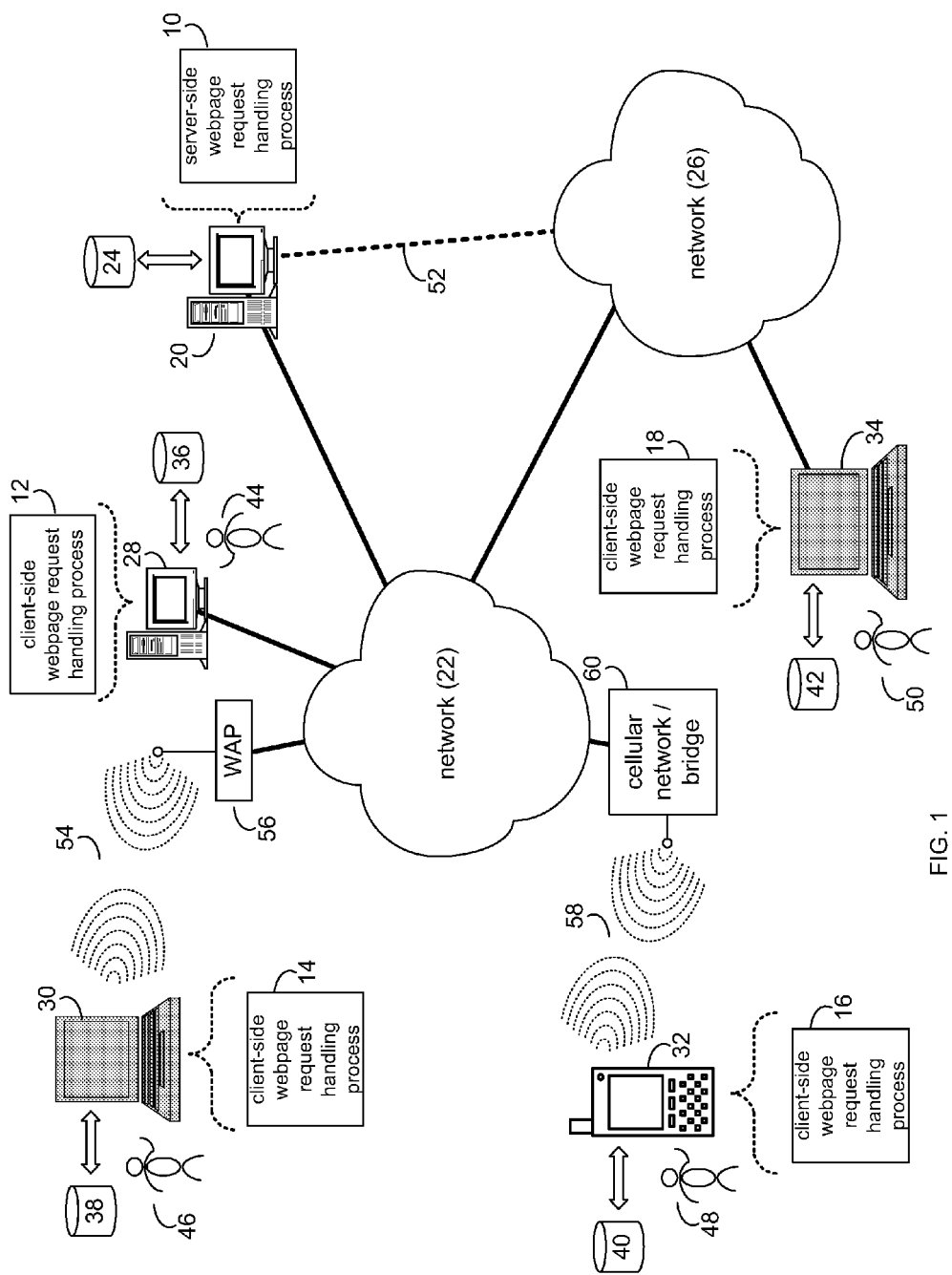
FIG. 1 is a diagrammatic view of a webpage request handling process coupled to a distributed computing network.
Figure 2:
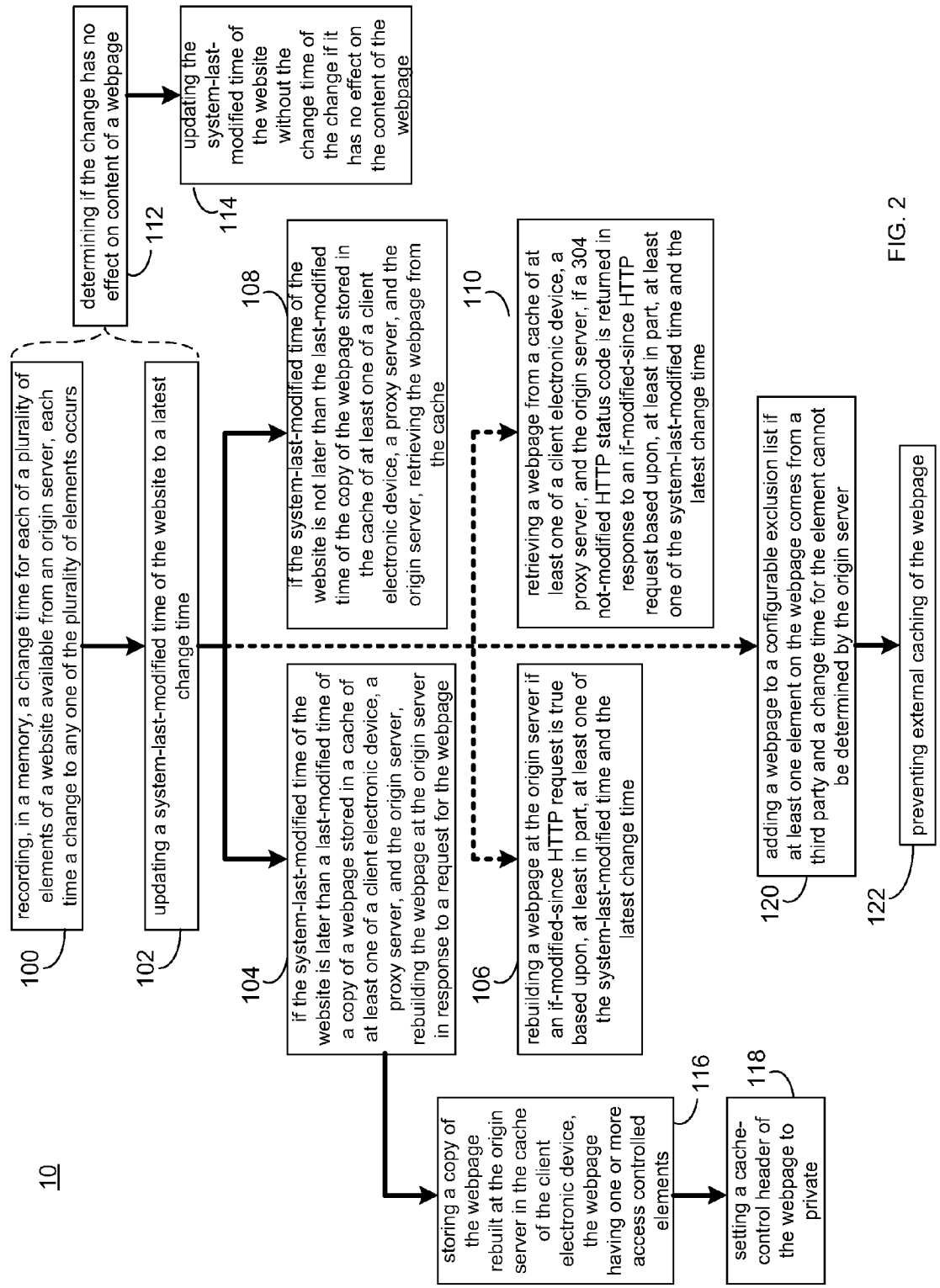
FIG. 2 is a flowchart of the webpage request handling process of FIG. 1.

Referring to FIGS. 1 & 2, there is shown a webpage request handling process 10. As will be discussed below, webpage request handling process 10 may record 100, in a memory, a change time for each of a plurality of elements of a website available from an origin server, each time a change to any one of the plurality of elements occurs. A system-last-modified time of the website may be updated 102 to a latest change time.

The webpage request handling (WRH) process may be a server-side process (e.g., server-side WRH process 10), a client-side process (e.g., client-side WRH process 12, client-side WRH process 14, client-side WRH process 16, or client-side WRH process 18), or a hybrid server-side/client-side process (e.g., the combination of server-side WRH process 10 and one or more of client-side WRH processes 12, 14, 16, 18).

Server-side WRH process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example.

The instruction sets and subroutines of server-side WRH process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side WRH processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, proxy server (not shown) personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CE®, Red Hat® Linux®, or a custom operating system.

The instruction sets and subroutines of client-side WRH processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side WRH processes 12, 14, 16, 18 and/or server-side WRH process 10 may be processes that run within (i.e., are part of) other applications, including, but not limited to, a web server application (e.g., Microsoft® IIS, Novell® Web Server, or Apache® Webserver). Alternatively, client-side WRH processes 12, 14, 16, 18 and/or server-side WRH process 10 may be stand-alone applications that work in conjunction with another application such as a web server application. One or more of client-side WRH processes 12, 14, 16, 18 and server-side WRH process 10 may interface with each other (via network 22 and/or network 26).

Users 44, 46, 48, 50 may access server-side WRH process 10 directly through the device on which the client-side WRH process (e.g., client-side WRH processes 12, 14, 16, 18) is executed, namely client electronic devices 28, 30, 32, 34, for example. Users 44, 46, 48, 50 may access server-side WRH process 10 directly through network 22 and/or through secondary network 26. Further, server computer 20 (i.e., the computer that executes server-side WRH process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Webpage Request Handling Process

User agents and proxy servers may store a local copy of a webpage. When the webpage is requested from an origin server, the local copy may be returned rather than retrieving the webpage again from the origin server. User agents and/or proxy servers may request the origin server to check if the webpage has been modified since it was stored locally. If the webpage has not been modified, the local copy may be returned. If the webpage has been modified, the origin server may return the full webpage as modified. The user agent and/or proxy server may then update its local copy of the webpage. Retrieving the webpage locally from a cache at the user agent and/or proxy server may reduce load on the origin server in terms of processing (by not having to rebuild the page) and bandwidth (by not having to return the page).

Dynamically rendered web pages may be generated by aggregating various elements such as templates, reusable fragments, content items, content queries and other elements that have their own modification times. For dynamically rendered web pages, it may be difficult to calculate a last modified time, especially where there are query results included therein. User agents and/or proxy servers may be forced to retrieve dynamically rendered web pages from the origin server. A "main element" of the web page may be used to approximate a last modified time for the page, however this may lead to caching pages that have been modified in content besides the "main element". However, assuming that all of the data of the webpage is from a known data source, a system wide last modification time can be calculated, as will be described below in greater detail.

Figure 4:
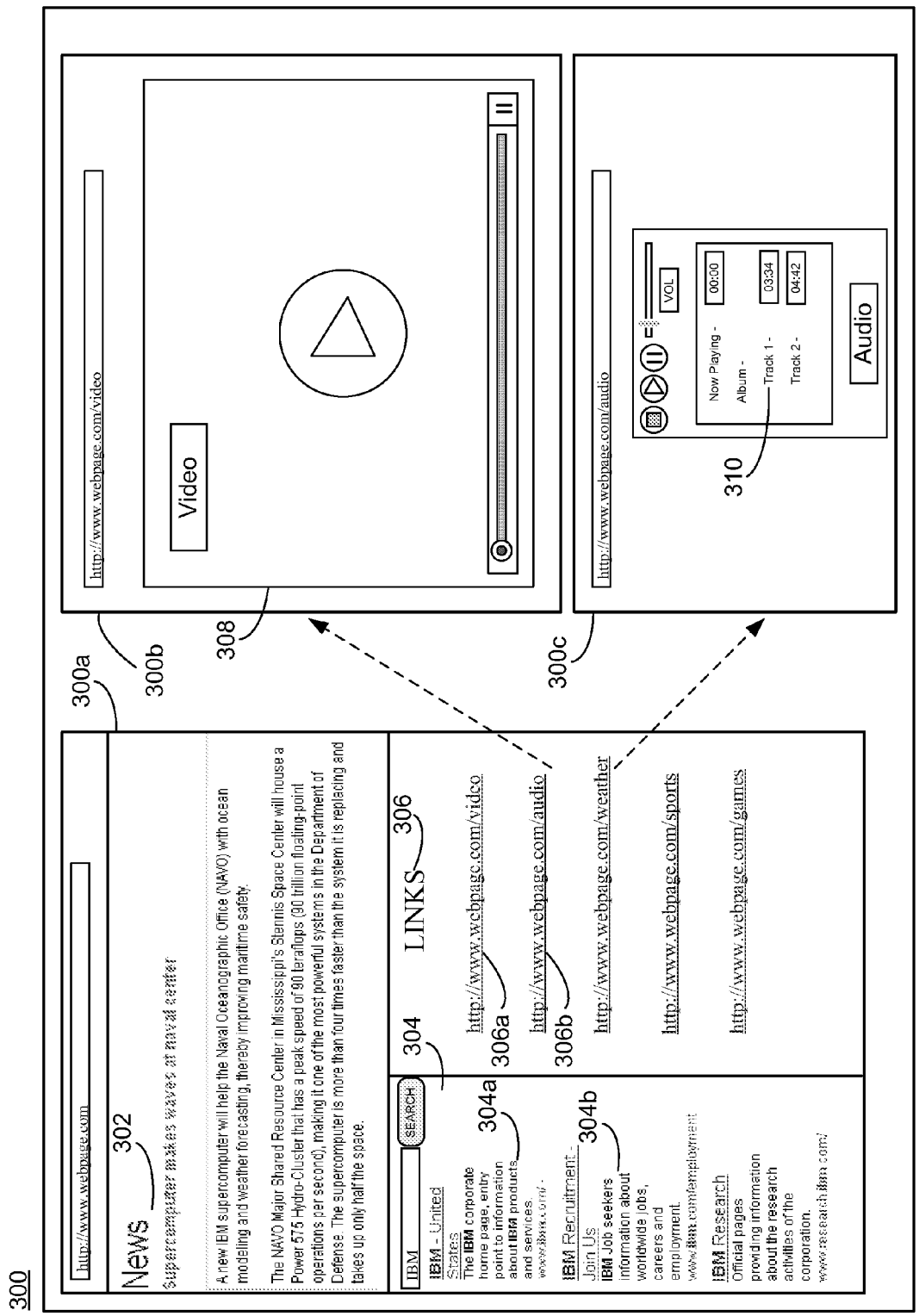
FIG. 4 is an illustrative website associated with the webpage request handling process.

The term "website" may be used herein to describe a collection of web pages and elements and/or content of the collection of web pages. The term "element" may be used herein to describe content of the web pages of the website. For example, and as shown in FIG. 4, website 300 may include webpage 300a, webpage 300b, and webpage 300c. Webpage 300a may include one or more elements, including but not limited to news story 302, search result 304 (which may include search results 304a and 304b), and one or more links 306 (which may include link 306a and 306b). Further, webpage 300b may include one or more elements, including but not limited to video 308. Additionally, webpage 300c may include one or more elements, including but not limited to audio track 310. Links 306a and 306b may be hyperlinks that navigate from webpage 300a to webpage 300b or 300c.

While server-side WRH process 10 will be referenced below for illustrative purposes only, this discussion may also be applicable to client-side WRH processes 12, 14, 16, 18. Referring now to FIGS. 1-5, server-side WRH process 10 may record 100, in a memory (e.g., storage device 24), a change time (e.g., change times 404, 406, 408, 410) for each of plurality of elements 402 of website 300 available from an origin server (e.g., server computer 20, origin server 206), each time a change to any one of plurality of elements 402 occurs. Plurality of elements 402 (shown in chart 400 of FIG. 5) may also be available from origin data source 238, which may be accessed by origin server 206. Each of plurality of elements 402 may be any type of web content, including, but not limited to data, files, documents (e.g., news story 302), applications, images, audio (e.g., audio track 310), video (e.g., video 308), and/or query results (e.g., search result 304). Change times 404, 406, 408, 410 may include dates and times, as shown in FIG. 5. A change to an element of website 300 may be an edit, update, or any other modification.

For example, and as shown in website 300 and chart 400 of FIGS. 4 & 5 respectively, if news story 302 is edited to correct typos, or updated to reflect more current news, on Dec. 18, 2009 at 15:30:00 Greenwich Mean Time (GMT), change time 406 (i.e., Dec. 18, 2009, 15:30:00 GMT) may be recorded. Further by way of example, if search result 304 changes to reflect a change in one of the search results (e.g., search result 304a, 304b) on Dec. 18, 2009 at 18:33:37 GMT, change time 410 (i.e., Dec. 18, 2009, 18:33:37 GMT) may be recorded. While search result 304 is shown as being embedded in webpage 300a in this example, it should be noted that a search result (e.g., search result 304) may be the entire contents of a webpage.

WRH process 10 may update 102 system-last-modified time 412 of website 300 to a latest change time (e.g., change time 410). The latest change time may be the change time of the most recently modified element on website 300. As shown in FIG. 5, the latest change time of website 300 may be change time 410 (i.e., Dec. 18, 2009, 18:33:37 GMT) of search result 304, since it is the change time of the most recently modified element on website 300. While change time 410 is shown in FIG. 5 as reflecting the latest change time of both search results 304a and 304b, it should be noted that search results 304a and 304b may each have their own change times which may be recorded and used to determine system-last-modified time 412. As such, WRH process 10 may update system-last-modified time 412 of website 300 to change time 410. In this way, system-last-modified time 412 of website 300 may be the time an element (e.g., news story 302, audio track 310, video 308, and/or search result 304) of website 300 most recently changed.

Figure 3:
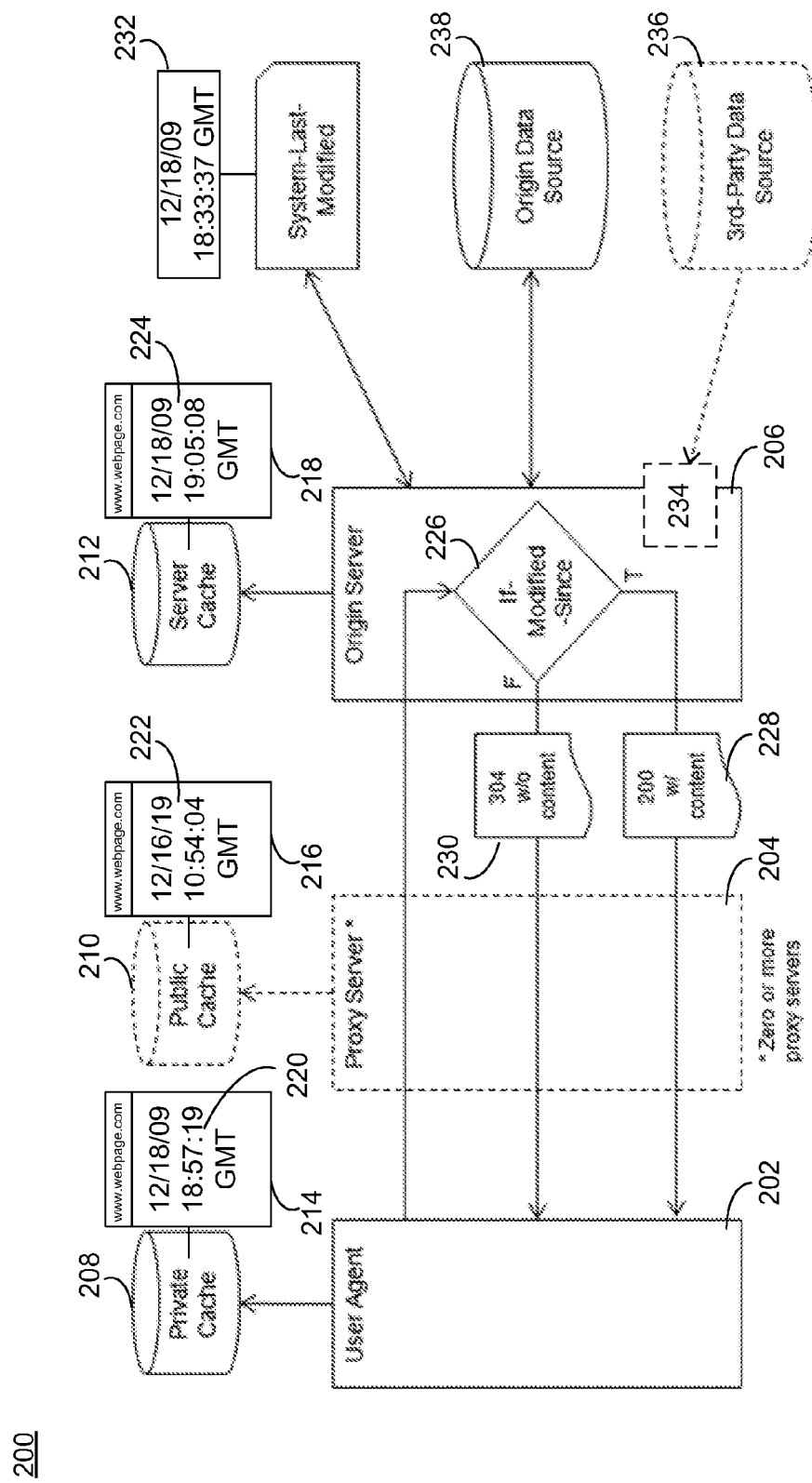
FIG. 3 is a diagrammatic flowchart of the webpage request handling process of FIG. 1.

Referring now also to FIG. 3, if system-last-modified time 412 of website 300 is later than a last-modified time (e.g., last-modified time 220, 222, 224) of a copy of webpage 300a (e.g., copy 214, 216, 218) stored in a cache (e.g., private cache 208, public cache 210, server cache 212) of at least one of a client electronic device (e.g., user agent 202), a proxy server (e.g., proxy server 204), and the origin server (e.g., origin server 206), WRH process 10 may rebuild 104 webpage 300a at origin server 206 in response to a request for webpage 300a. The last-modified time (e.g., last-modified time 220, 222, 224) may be the most recent time that an element of website 300 was modified when the copy of webpage 300a (e.g., copy 214, 216, 218) was stored in the cache (e.g., private cache 208, public cache 210, server cache 212). Private cache 208, public cache 210, and/or server cache 212 may be located in an internal or external memory (e.g., storage device) of a client electronic device (e.g., user agent 202), a proxy server (e.g., proxy server 204), and/or the origin server (e.g., origin server 206).

User agent 202 may be any one of client electronic devices 28, 30, 32, 34 mentioned above. User agent 202 may request webpage 300a from origin server 206. Further, user agent 202 may receive webpage 300a from origin server 206 and may cache (i.e., store) a copy of webpage 300a (e.g., copy 214) in its internal or external memory (e.g., private cache 208 and/or storage devices 36, 38, 40, 42). If user agent 202 subsequently requests webpage 300a, the copy (e.g., copy 214) may be fetched from private cache 208 of user agent 202, rather than causing origin server 206 to rebuild webpage 300a.

Proxy server 204 may be a computer similar to server computer 20 discussed above and may be in communication with any one of client electronic devices 28, 30, 32, 34 and/or server computer 20. One or more proxy servers (e.g., proxy server 204) may receive a request for webpage 300a from user agent 202 (e.g., client electronic devices 28, 30, 32, 34) when user agent 202 requests webpage 300a from origin server 206. Further, proxy server 204 may receive webpage 300a from origin server 206 and may cache (i.e., store) a copy of webpage 300a (e.g. copy 216) in its internal or external memory (e.g., public cache 210). In this way, proxy server 204 may serve as an intermediary between user agent 202 and origin server 206. Each time user agent 202 or other user agents request webpage 300a, proxy server 204 may cache a copy of webpage 300a. If user agent 202 subsequently requests webpage 300a, the copy (e.g., copy 216) may be fetched from public cache 210 of proxy server 214, rather than causing origin server 206 to rebuild webpage 300a.

Origin server 206 may also be a computer similar to server computer 20 discussed above. Further, origin server 206 may be a web server configured to build and serve web pages to clients (e.g., user agent 202 and/or client electronic devices 28, 30, 32, 34). Origin server 206 may receive a request for webpage 300a from user agent 202 and/or proxy server 204 when user agent 202 requests webpage 300a from origin server 206. Each time origin server 206 builds webpage 300a in response to a request for webpage 300a from user agent 202 and/or proxy server 204, origin server 206 may cache (i.e., store) a copy of webpage 300a (e.g., copy 218) in its internal or external memory (e.g., server cache 212). If user agent 202 and/or proxy server 204 subsequently request webpage 300a, the copy (e.g., copy 218) may be fetched from server cache 212 of origin server 206, rather than causing origin server 206 to rebuild webpage 300a.

If if-modified-since HTTP request 226 is true based upon, at least in part, at least one of system-last-modified time 412 and the latest change time (e.g., change time 410), WRH process 10 may rebuild 106 webpage 300a at origin server 206. If-modified-since HTTP request 226 may be a hypertext transfer protocol (HTTP) header used when requesting a webpage (e.g., webpage 300a). If the website content (e.g., news story 302, audio track 310, video 308, and/or search result 304) has changed since a time specified in the header, if-modified-since HTTP request 226 may be true. For example, if-modified-since HTTP request 226 may be a header such as "if-modified-since: Wed, 16 Dec. 2009 10:54:04 GMT" (i.e., last-modified time 222 of copy 216 of webpage 300a). As shown in FIG. 5 the latest change time (e.g., change time 410) and/or system-last-modified time 412 may be Dec. 18, 2009, 18:33:37 GMT. In this example, if-modified-since HTTP request 226 (i.e., "if-modified-since: Wed, 16 Dec. 2009 10:54:04 GMT") may return true, or a "200" HTTP status code. "200" may be the standard response for a successful HTTP request. In other words, at least one element of website 300 has been modified since a copy of webpage 300a was cached at proxy server 204. As such, WRH process 10 may rebuild webpage 300a at origin server 206. In this situation, the "200" HTTP status code may be returned with content (i.e., with the webpage), as shown in FIG. 3 by "200" HTTP status code block 228.

If system-last-modified time 412 (shown as system-last-modified time 232 in FIG. 3) of website 300 is not later than the last-modified time (e.g., last modified time 220, 222, 224) of the copy of the webpage (e.g., copy 214, 216, 218) stored in a cache (e.g., private cache 208, public cache 210, server cache 212) of at least one of a client electronic device (e.g., user agent 202), a proxy server (e.g., proxy server 204), and the origin server (e.g., origin server 206), WRH process 10 may retrieve 108 webpage 300a from the cache (e.g., private cache 208, public cache 210, server cache 212). Since the system-last-modified time may be the time of the most recent modification across the entire website, it may be assumed that if no element across the entire website has changed, none of the web pages (e.g., web pages 300a, 300b, 300c) of the website have changed. Further, if a "304" not-modified HTTP status code is returned in response to if-modified-since HTTP request 226 based upon, at least in part, at least one of system-last-modified time 232 and the latest change time (e.g., change time 410), WRH process 10 may retrieve 110 webpage 300a from a cache (e.g., private cache 208, public cache 210, server cache 212) of at least one of a client electronic device (e.g., user agent 202), a proxy server (e.g., proxy server 204), and the origin server (e.g., origin server 206).

For example, if-modified-since HTTP request 226 may be a header such as "if-modified-since: Fri, 18 Dec. 2009 18:57:19 GMT" (i.e., last modified time 220). As shown in FIG. 5, the latest change time (e.g., change time 410) and/or system-last modified time 412 (shown in FIG. 3 as system-last-modified time 232) may be Dec. 18, 2009, 18:33:37 GMT. In this example, if-modified-since HTTP request 226 (i.e., "if-modified-since: Fri, 18 Dec. 2009 18:57:19 GMT") may return false, or a "304" HTTP status code. "304" may be the standard response to an if-modified-since HTTP request if the website including the requested webpage (e.g., website 300 including webpage 300a) has not been modified since the time included in the request (i.e., "if-modified-since: Fri, 18 Dec. 2009 18:57:19 GMT"). In other words, in this example, none of the elements of website 300 have been modified since a copy of webpage 300a was cached at user agent 202. As such, WRH process 10 may retrieve webpage 300a from private cache 208 of user agent 202. In this situation, the "304" HTTP status code may be returned without content (i.e., the webpage), as shown in FIG. 3 by "304" HTTP status code block 230.

In one implementation a request for a webpage may be received by the server (e.g., origin server 206). If the webpage was requested previously, the requesting client (e.g., user agent 202 or proxy server 204) may pass the last-modified time of the webpage it received the last time the webpage was requested to the origin server. If the system-last-modified time (i.e., system-last-modified time 232 associated with website 300) is older or equal to the last-modified time of the webpage, then the webpage may not have any changed content, and the origin server may return a "304" response, as described above. If the system-last-modified time (i.e., system-last-modified time 232 associated with website 300) is newer than the last-modified time of the webpage, then the webpage may have changed and the origin server may build and/or generate the webpage and return the webpage with a "200" response, as described above. The last-modified time returned with this generated webpage may be the system-last-modified time (i.e., system-last-modified time 232 associated with website 300). It should be noted that if the webpage has not been requested previously, the requesting client may not pass a last-modified time. In such a case, the origin server may build and/or generate the webpage and return it. Similarly, the last-modified time returned with this generated webpage may also be the system-last-modified time (i.e., system-last-modified time 232 associated with website 300).

In some implementations, WRH process 10 may determine 112 if a change to an element of website 300 has little or no effect on the content of a webpage (e.g., web pages 300a, 300b, 300c). For example, modifications to business processes data and/or author-time validation rules may never have an effect on the content of a webpage. Further, WRH process 10 may update 114 system-last-modified time 320 of website 300 without the change time (e.g., change time 404, 406, 408, 410) if the change to an element of website 300 has no effect on the content of the webpage (e.g., webpage 300a, 300b, 300c).

WRH process 10 may also store 116 the copy of the webpage (e.g., copy 214, 216, 218) rebuilt at origin server 206 in the cache (e.g. private cache 208) of the client electronic device (e.g., client electronic devices 28, 30, 32, 34), wherein the webpage (e.g., webpage 300a, 300b, 300c) may have one or more access controlled elements. While building an aggregated webpage, various elements of the webpage may have different access control. These elements may not be visible to all users. Further, some elements may react to individual user attributes, on a user by user basis, in order to personalize webpage content. For web pages having access controlled elements, it may not be possible to store a copy of the webpage in a cache of a proxy server (e.g., public cache 210 on proxy server 204). However, it may still be possible to store a copy of the webpage in a cache of a user agent (e.g., private cache 208 of user agent 202). For these types of web pages, a cache-control header of the web pages may need to be set 118 to "private" so that the access controlled elements may only be viewed by the user.

Further, WRH process 10 may add 120 a webpage (e.g., webpage 300a, 300b, 300c) to configurable exclusion list 234 if at least one element (e.g., news story 302, audio track 310, video 308, and/or search result 304) of website 300 comes from a third party (e.g., third party data source 236) and a change time (e.g., 404, 406, 408, 410) for the element cannot be determined by origin server 206. Configurable exclusion list 234 may be a list of web pages having at least one element for which the change time cannot be determined because the element comes from another server or other data source (e.g., third part data source 236). Web pages in configurable exclusion list 234 may need to be rendered dynamically or built at origin server 206 every time they are requested. As such, web pages in configurable exclusion list 234 may be prevented 122 from being cached externally, or may be prevented from being cached in private cache 208, public cache 210, or server cache 212. Additionally, the if-modified-since code may be used to prevent external caching of web pages in configurable exclusion list 234. It should be noted that if the change time for the element of website 300 can be calculated for the third party content, then WRH process 10 may handle a webpage (e.g., webpage 300a, 300b, 300c) with third party content as previously discussed above.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
   generating, at an origin server and by operation of one or more computer processors, content of a webpage using a plurality of elements;
   upon detecting a modification to an element of the plurality of elements, determining a change time at which the element was modified; and
   upon determining that the modification to the element has no effect on the generated content of the webpage, disregarding the change time of the latest change with respect to a system-last-modified time of the webpage; and
   comparing the system-last-modified time of the webpage against a last modified time of a copy of the webpage.

2. The method of claim 1, further comprising:
   upon determining that the system-last-modified time of the webpage is later than the last-modified time of the copy of the webpage stored in a cache of at least one of a client electronic device, a proxy server, and the origin server, rebuilding the webpage at the origin server in response to a request for the webpage.

3. The method of claim 1, further comprising:
   upon determining that the system-last-modified time of the webpage is not later than the last-modified time of the copy of the webpage stored in a cache of at least one of a client electronic device, a proxy server, and the origin server, retrieving the copy of the webpage from the cache.

4. The method of claim 1, further comprising:
   rebuilding the webpage at the origin server upon determining that an if-modified-since HTTP request is true based upon, at least in part, at least one of the system-last-modified time and the change time of the element.

5. The method of claim 1, further comprising:
   retrieving the copy of the webpage from a cache of at least one of a client electronic device, a proxy server, and the origin server upon determining that a 304 not-modified HTTP status code is returned in response to an if-modified-since HTTP request based upon, at least in part, at least one of the system-last-modified time and the change time of the element.

6. The method of claim 1, further comprising:
   upon detecting a second modification to a second element of the plurality of elements, determining a second change time at which the second element was modified;
   upon determining that the second detected modification to the second element has an effect on the generated content of the webpage, updating the system-last-modified time of the webpage to the second change time.

7. The method of claim 2, further comprising:
   upon determining that the webpage has one or more access controlled elements:
      storing a copy of the webpage rebuilt at the origin server in the cache of the client electronic device; and
      setting a cache-control header of the webpage to private.

8. The method of claim 1, further comprising:
   adding the webpage to a configurable exclusion list upon determining that (i) at least one element on the webpage comes from a third party data source and (ii) the origin server cannot determine a change time for the at least one element; and
   preventing external caching of the webpage on the configurable exclusion list.

9. A computer program product residing on a computer readable storage medium having a plurality of instructions stored thereon, which, when executed by a processor, cause the processor to perform operations comprising:
   generating, at an origin server, content of a webpage using a plurality of elements;
   upon detecting a modification to an element of the plurality of elements, determining a change time at which the element was modified; and
   upon determining that the modification to the element has no effect on the generated content of the webpage, disregarding the change time of the latest change with respect to a system-last-modified time of the webpage; and
   comparing the system-last-modified time of the webpage against a last modified time of a copy of the webpage.

10. The computer program product of claim 9, the operations further comprising:
    upon determining that the system-last-modified time of the webpage is later than the last-modified time of the copy of the webpage stored in a cache of at least one of a client electronic device, a proxy server, and the origin server, rebuilding the webpage at the origin server in response to a request for the webpage.

11. The computer program product of claim 9, the operations further comprising:
    upon determining that the system-last-modified time of the webpage is not later than the last-modified time of the copy of the webpage stored in a cache of at least one of a client electronic device, a proxy server, and the origin server, retrieving the copy of the webpage from the cache.

12. The computer program product of claim 9, the operations further comprising:
  rebuilding the webpage at the origin server upon determining that an if-modified-since HTTP request is true based upon, at least in part, at least one of the system-last-modified time and the change time of the element.

13. The computer program product of claim 9, the operations further comprising:
  retrieving the copy of the webpage from a cache of at least one of a client electronic device, a proxy server, and the origin server upon determining that a 304 not-modified HTTP status code is returned in response to an if-modified-since HTTP request based upon, at least in part, at least one of the system-last-modified time and the change time of the element.

14. The computer program product of claim 9, the operations further comprising:
  upon detecting a second modification to a second element of the plurality of elements, determining a second change time at which the second element was modified;
  upon determining that the second detected modification to the second element has an effect on the generated content of the webpage, updating the system-last-modified time of the webpage to the second change time.

15. The computer program product of claim 10, the operations further comprising:
  upon determining that the webpage has one or more access controlled elements:
    storing a copy of the webpage rebuilt at the origin server in the cache of the client electronic device; and
    setting a cache-control header of the webpage to private.

16. The computer program product of claim 9, the operations further comprising:
  adding the webpage to a configurable exclusion list upon determining that (i) at least one element on the webpage comes from a third party data source and (ii) the origin server cannot determine a change time for the at least one element; and
  preventing external caching of the webpage on the configurable exclusion list.

17. An origin server, comprising:
  at least one processor;
  at least one memory architecture coupled with the at least one processor and containing a program that, when executed on the at least one processor, performs operations comprising:
    generating, at the origin server, content of a webpage using a plurality of elements;
    upon detecting a modification to an element of the plurality of elements, determining a change time at which the element was modified;
  and
    upon determining that the modification to the element has no effect on the generated content of the webpage, disregarding the change time of the latest change with respect to a system-last-modified time of the webpage; and
    comparing the system-last-modified time of the webpage against a last modified time of a copy of the webpage.

18. The computing system of claim 17, the operations further comprising:
  upon determining that the system-last-modified time of the webpage is later than the last-modified time of the copy of the webpage stored in a cache of at least one of a client electronic device, a proxy server, and the origin server, rebuilding the webpage at the origin server in response to a request for the webpage.

19. The computing system of claim 17, the operations further comprising:
  upon determining that the system-last-modified time of the webpage is not later than the last-modified time of the copy of the webpage stored in a cache of at least one of a client electronic device, a proxy server, and the origin server, retrieving the copy of the webpage from the cache.

20. The computing system of claim 17, the operations further comprising:
  rebuilding the webpage at the origin server upon determining that an if-modified-since HTTP request is true based upon, at least in part, at least one of the system-last-modified time and the change time of the element.

* * * * *